Figure 1:
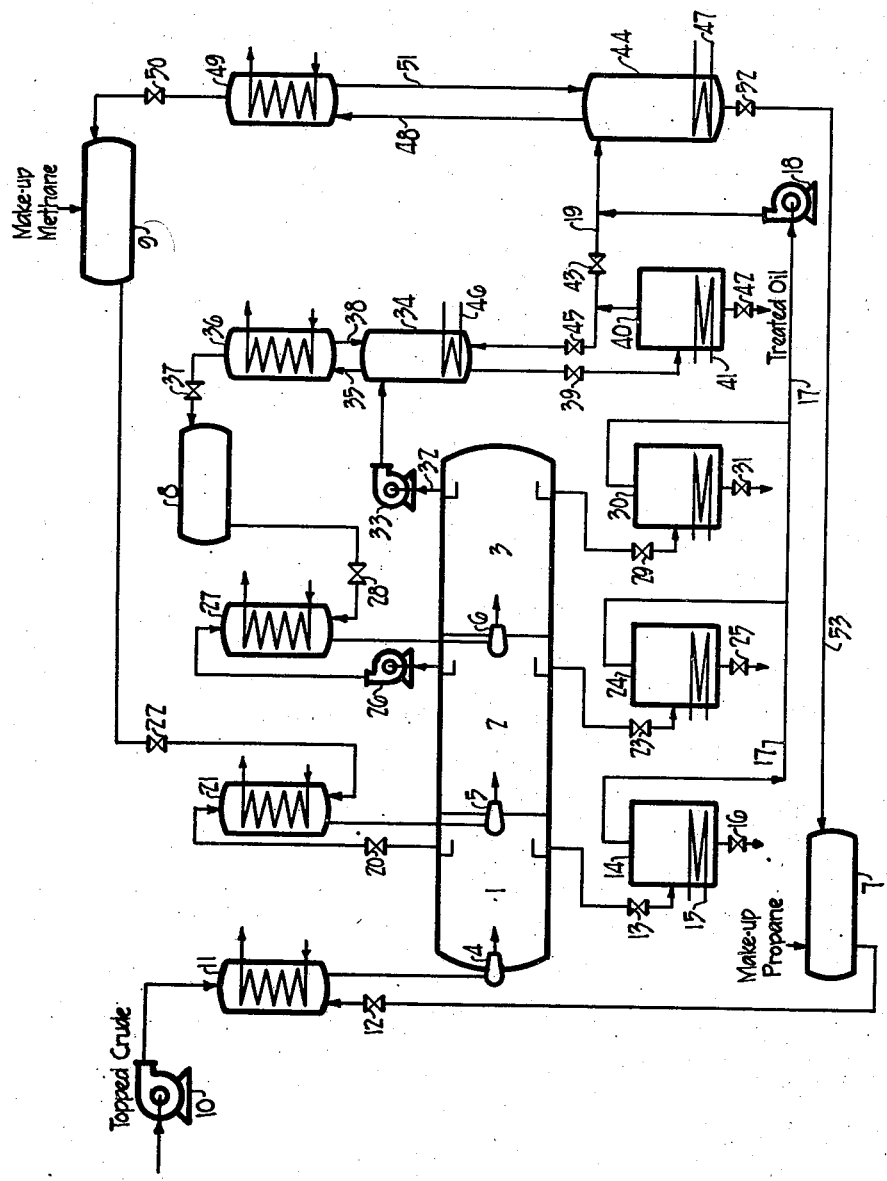

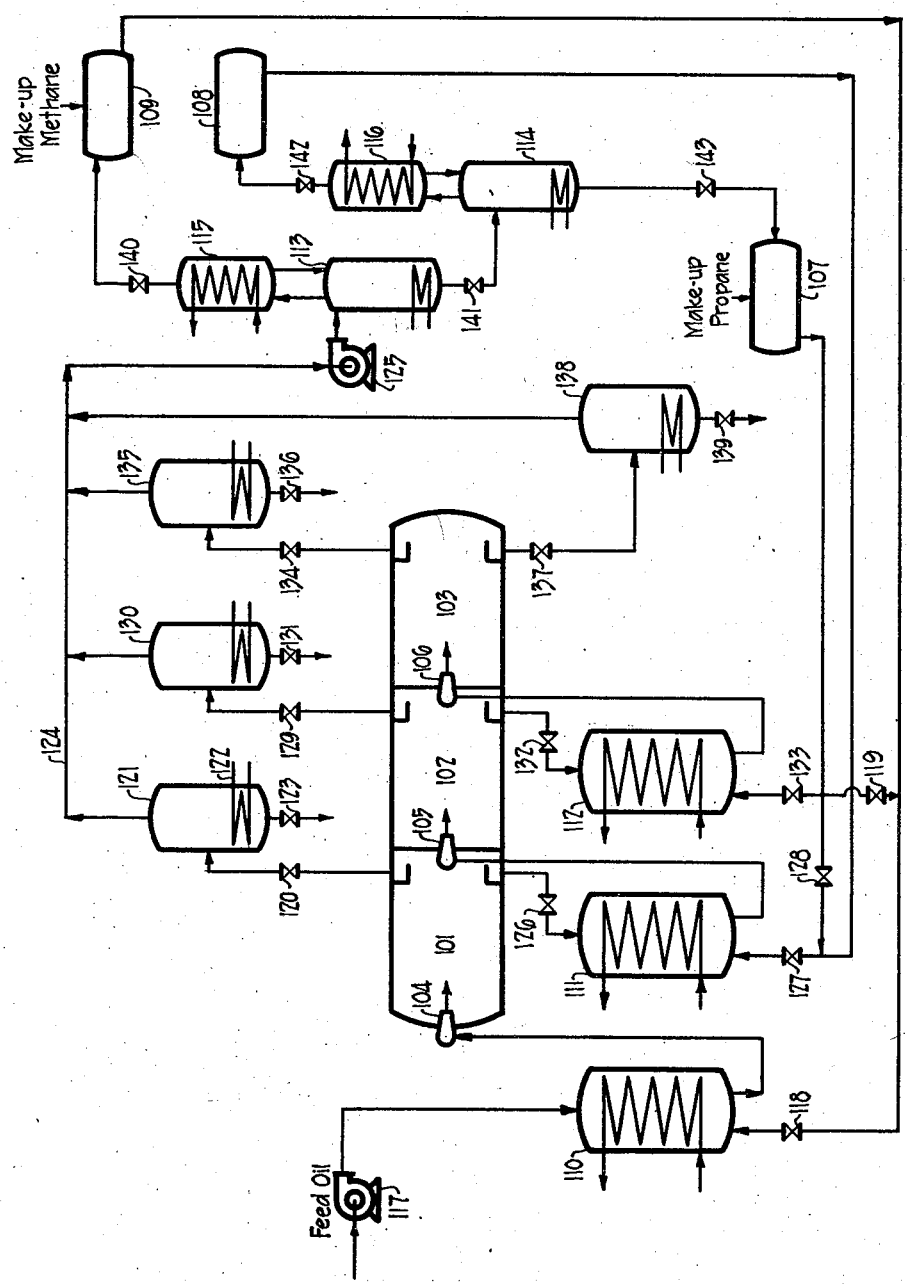

Patented Nov. 12, 1940

2,221,093

UNITED STATES PATENT OFFICE 2,221,093

EXTRACTION PROCESS

Eric Stanley Hillman, Berkeley, and Wells Alan Webb, Albany, Calif., assignors to Shell Development Company, San Francisco, Calif., a corporation of Delaware Application January 17, 1939, Serial No. 251,344

6 Claims. (Cl. 196—13)

This invention pertains to a process for separating mixtures of high molecular weight substances, such as mineral oil fractions, shale oils, and other hydrocarbon and non-hydrocarbon mixtures, particularly coal tar, animal and vegetable oils like linseed oil, voltolized rapeseed oil, neat's-foot oil, etc., into portions having different properties, by means of mixed solvents of lower molecular weight having a constituent which is in a paracritical state under the conditions of the process.

It is already known to employ such solvent mixtures to separate high molecular weight mixtures. According to one form of such a treatment the constituents of the mixed solvent are added separately to the initial mixture to be fractionated, such as topped petroleum crude, as follows: One part of the oil is first dissolved in about 2 to 10 parts of a liquid diluent such as propane, butane, or isopentane, and a gas, such as methane, ethane, or carbon dioxide is dissolved in the resulting solution at a temperature such as from 0° C. to 400° C. at which the gas is in the paracritical state, under a superatmospheric pressure usually, from about 10 to 400 atmospheres, high enough to dissolve the quantity of the gas required to cause the density and/or the internal pressure of the initial oil to be lowered sufficiently to cause "demixing" thereof, i. e., to cause its separation into two non-gaseous phases of different specific gravities, which may be separated by any physical means. When the gas is dissolved in the oil-diluent solution, it is combined with the diluent, the diluent being effective to vary the density of the gas and to promote its solubility in the oil, and the diluent and condensed gas together form a mixed solvent which is effective to produce the desired formation of two phases. In this mixture the dissolved gas is the light constituent in the paracritical state. The lighter of these non-gaseous phases is usually liquid and contains the high molecular weight substances of relatively lower internal pressures and/or molecular weights, e. g., the more paraffinic and less viscous oil, together with most of the mixed solvent; the heavier or precipitated phase, which is usually liquid but may with certain initial materials contain solid asphaltic and similar bodies, contains the high molecular weight substances of relatively greater internal pressures and/or molecular weights, e. g., the asphaltic, more aromatic and more naphthenic oils, and only minor amounts of the solvent. In such a process the solvent or a constituent thereof (the latter being also sometimes known as the "treating agent") is said to be in the "paracritical state" when its temperature is not lower than about 40° C. below the critical temperature of the solvent or of the constituent under consideration, respectively, i. e., it includes temperatures above the critical, the critical temperature itself, and temperatures between the critical and about 40° C. below the critical. The effect of the mixed solvent, and particularly of the constituent thereof which is in the paracritical state, is believed to be a lowering of the internal pressure and/or the density of the initial mixture to an extent causing certain constituents thereof, particularly those of relatively higher internal pressures, densities, or molecular weights, to become immiscible with the other constituents of the mixture which remain in solution with the mixed solvent.

This effect is to be distinguished from that produced by the more usual selective solvents such as sulfur dioxide, furfural, aniline, phenol, cresylic acid, etc., which are polar and which are employed at temperatures considerably below their critical temperatures, i. e., below the paracritical range. These solvents dissolve the constituents of highest internal pressure, e. g., the aromatic and more naphthenic hydrocarbons, leaving the more paraffinic hydrocarbons undissolved. Their solvent action is the same also when added to the oil in the gaseous state, as is sometimes the case with sulfur dioxide, which, when employed at temperatures below the paracritical temperature for the solvent, is condensed in the oil and behaves as it does when it is added in the liquid state.

Processes using solvents in the paracritical state, with which this invention is particularly concerned, are efficaciously carried out under conditions causing one or more of the constituents of the mixed solvent to be in the paracritical state, or above the critical temperature, although it is usual to operate at temperatures at which one or several constituents are below the paracritical range and another or several constituents are in the paracritical range, preferably above the critical temperature.

It is an object of the invention to provide an improved method of fractionating mixtures of high molecular weight in a plurality of stages operated at progressively different, i. e., increased or decreased concentration of a mixed solvent of lower molecular weight than the mixture, at least one constituent of which is in the paracritical state, either to produce a plurality of separate precipitated fractions or only one precipitated fraction and one soluble fraction, with a minimum expenditure of energy in pumping costs and the like. A further object is to provide an improvement in a process of the type described wherein the recovery of the solvent for re-use in the process is simplified. Other objects of the invention will be apparent from the following specification.

These objects are realized according to the present invention by subjecting the high molecular weight mixture repeatedly to the precipitating action of mixed solvents of the type described in a series of stages to which successive solvent mixtures of progressively varying average molecular weights are added, causing a separation of the mixture in each stage into non-gaseous phases, which are separated. In the embodiment wherein the lighter phase is further treated, it is preferred to add solvent mixtures of progressively lower average molecular weights, while in processes involving the further separation of the heavier phase, a solvent mixture of higher average molecular weight is added. The precipitated, heavier phase is withdrawn from each stage and either removed as a product of the process or returned to an earlier stage, and one or more ultimate lighter phase, after the separation of the last precipitated phase, is passed through a series of evaporating or distilling stages, operated under conditions causing successive vapors containing the solvent, and of progressively different, usually higher average molecular weights to be separated, the vapors being then separately returned to the treating stages. Successive vaporizers will produce vapors of progressively increasing average molecular weight, the vapors from the last separator being richer in the higher molecular weight constituent of the solvent and hence performing less precipitating action on the material to be treated in the corresponding phase separator. Thus, the vapors from the last vaporizer will be suitable for use in the first stage and the vapors from the first vaporizer will be suitable for use in the last stage, when lighter phases are successively treated. It is apparent with this arrangement that it becomes unnecessary to effect a complete separation between the constituents of the solvent, since each vapor is of a composition suitable for use in one of the several stages. The successive treating stages may consist of a plurality of mixing and settling units, or, if desired, the stages of the process may be carried out in a single vessel, employing a batch method of operation. For the sake of clarity, the invention will be described in detail with reference to a continuous treatment employing separate equipment for each stage.

The invention will be understood more fully from the following description, taken together with the accompanying drawings, the Figure 1 of which is a schematic flow diagram of one embodiment thereof, as applied to the treatment of a topped petroleum oil containing mainly constituents of lubricating viscosity range, employing a mixed solvent consisting of propane and methane wherein the lighter phase from each stage is further treated; and Figure 2 is a similar diagram of a modified embodiment wherein the heavier phase is further treated.

Referring to Figure 1, 1, 2, and 3 are settling chambers adapted to function as phase separators, formed by partitioning a horizontal cylindrical shell, each chamber being provided with a nozzle, shown at 4, 5, and 6, for introducing a mixture of phases to be separated with a minimum of turbulence. Other forms of separators, such as centrifuges and the like may also be employed. 7, 8, and 9 are surge tanks for solvent, the solvent in tank 7 containing the highest proportion of propane (and being of the highest average molecular weight) and the solvent in tank 8 being richest in methane (and being of the lowest average molecular weight), the composition of the solvent in tank 9 being intermediate to those in the other tanks. The solvent in the tank 7 may be either gaseous or liquid, while those in tanks 8 and 9 are in the gaseous form. Methane and propane may initially be fed into these tanks, and further quantities may be added to replenish losses during the operation.

Topped crude to be fractionated is continuously fed to the system at a rate controlled by a pump 10 and introduced at the top of a heat exchanger 11, wherein it is brought into contact with the first mixed solvent from the tank 7, introduced via a valve 12 near the bottom, the oil and solvent being at any suitable pressure, such as 40.2 atmospheres. The rates of flow may, for example, be 1 gallon of topped crude to sufficient of the solvent to contain 30 pounds of propane. The composition and state of the solvent are determined by the conditions prevailing in the vaporizing system, subsequently described, and the composition may, for the conditions described herein, for example, be about 98 to 100 mole per cent propane. The introduction of the solvent at the bottom is desirable particularly when the solvent is in the gaseous state. In this case the oil descending the heat exchanger 11 dissolves the gas which rises countercurrently to it, being dispersed by suitable contact means, such as baffles, trays, etc., provided in the heat exchanger and is cooled by circulating a cooling fluid through a cooling coil to about the heat of condensation and to bring the temperature to a point at which substantially all of the gas is dissolved at the prevailing pressure, such as 40 to 80° C.

The resulting solution is withdrawn from the bottom of the heat exchanger and flowed through the nozzle 4 into the settling stage 1, wherein the solution of oil and solvent, forming a light liquid phase, is separated from the resulting precipitated heavy phase, containing asphaltic substances. The heavy phase is withdrawn via valve 13, and the relatively small amount of solvent contained therein is separated therefrom in the vaporizer 14 to which heat is supplied by steam coil 15, the precipitated substances being withdrawn via valve 16 and the solvent is withdrawn via conduit 17 and pump 18 and introduced into vapor line 19. The lighter liquid phase is withdrawn from the top of the settler via valve 20 at a pressure of about 40.1 atmospheres and introduced into the top of a heat exchanger 21 of construction similar to heat exchanger 11, and brought into contact with solvent vapors from the tank 9, fed via valve 22 to the bottom. The gaseous solvent mixture dissolved in the oil combines with solvent already contained in the lighter phase, to form the second mixed solvent which causes the formation of light and heavy phases in the second stage. The quantity of vapors dissolved in the oil is regulated so as to produce a second mixed solvent of the composition required to cause the oil to separate into two liquid phases of the desired composition, the size of the heavier phase being increased by an increase in the amount of the gas introduced. The temperature is lowered by the circulation of a cooling medium to cause the required amount of vaporized solvent to be dissolved in the oil solution, it being preferable not to cool the mixture substantially below the temperature required for this purpose. Thus, we prefer to operate at temperature not lower than 200° C. below the maximum temperature permissible for the solution of the required quantity of the vapors. While an excess of gas may be introduced, so as to form a vapor phase above the two liquid phases in the chamber 2, it is preferred to regulate the quantity of vapors so that substantially no gas phase exists therein.

The quantity of vapors admitted through the valve 22 for dissolution in the oil depends upon the nature of the oil, the nature of the products desired, and amount of solvent already in the oil as a result of the addition of solvent in the first stage, and upon the composition of the gaseous solvent mixture in the tank 9, the last being dependent upon the conditions in the vaporizing system. These vapors may, for example, consist of 54 mole percent methane and 46 mole percent propane, and the quantity regulated so that the mole ratio of methane to propane in the resulting second mixed solvent is 14.9 to 85.1. The temperature is then preferably lowered to the equilibrium temperature of a saturated liquid containing methane and propane in this ratio, at the prevailing pressure, i. e., about 40° C. The cooled mixture of liquid phases is flowed through the nozzle 5 into the chamber 2 and separated. The heavy layer is withdrawn via valve 23, treated in the vaporizer 24 to separate the small quantity of solvent contained therein, which is drawn off through the conduit 17 and pump 18. The precipitated heavy oil is withdrawn through valve 25.

The lighter liquid phase, containing most of the solvent and dissolved oil, is withdrawn from the top of the chamber 2 at a pressure of about 40 atmospheres, via pump 26 and introduced at the top of heat exchanger 27, constructed like heat exchanger 11, at a pressure of about 60.1 atmospheres and brought into contact with vapors from the tank 8 fed via valve 28 at a similar pressure, the quantity of vapors being determined as described for the second stage, so as to form a third mixed solvent comprised of the solvent carried over with the light phase from the chamber 2 and the added gaseous solvent mixture. The compositions of these vapors may, for example, be 61.5 mole percent methane and 38.5 mole percent propane, and the amount of vapors introduced may be such as to cause the ratio of methane to propane in the resulting third mixed solvent to be 26.6 to 73.4. The temperature is lowered by circulating a cooling medium to that required to dissolve the gas at the prevailing pressure, preferably the equilibrium pressure, i. e., about 40° C. The resulting mixture of phases is fed into the chamber 3 via nozzle 6, the heavier layer being withdrawn via valve 29 and treated in the vaporizer 30, from which the solvent is withdrawn via conduit 17 and pump 18 and the precipitated oil is withdrawn via valve 31.

The last light liquid phase is withdrawn at 32 at a pressure of about 60.0 atmospheres. To maintain circulation without pumping large amounts of vapors, it is desirable to operate the solvent recovery system at a pressure high enough to permit the vapors to be returned to the respective heat exchangers under their own pressures. For this purpose, a liquid pump 33 is provided to raise the pressure to about 60.5 atmospheres. The liquid phase is then introduced into the top of a fractionating column 34, which may be provided with bubble plates so as to separate vapors rich in methane. The temperature at the top plate may, for example, be 40° C. and that at the bottom about 80° C. Under these conditions vapors consisting of about 61.5 mole percent methane and 38.5 mole percent propane may be withdrawn via conduit 35, flowed through a partial condenser 36 operated at about 40° C., which is provided to insure a uniform composition of vapors and flowed through valve 37 to the tank 8. The partial condensate is returned to the column via conduit 38. Oil, together with unvaporized solvent, is withdrawn from the bottom of the column through valve 39 and introduced into the vaporizer 40, which may be heated to a suitable temperature, such as about 200° C. by feeding steam through heating coil 41. The oil which remained dissolved in the last light phase, freed from solvent, is withdrawn by a valve 42 and the vaporized solvent is withdrawn via pressure reducing valve 43 and conduit 19 to the fractionating column 44. A portion of these vapors may be returned to the column 34 via valve 45 to supply heat thereto. If desired, heat may also be supplied by means of a coil 46.

Vapors from the vaporizer 40 are introduced into the fractionating column 44 at a pressure of about 40.5 atmospheres, and the temperatures at the top of the column may be about 40° C., and at the bottom about 90 to 95° C. The column 44 may be similarly provided with bubble trays and may, if desired, be heated with a coil 47. Vapors are withdrawn through conduit 48, flowed through a partial condenser 49 operated at about 40° C., and introduced into the tank 9 via valve 50. These vapors will contain methane and propane in the mole ratio of about 54 to 46. The partial condensate is returned to the column via conduit 51. The bottom product from the column is withdrawn via valve 52 and introduced into the surge tank 7 via the conduit 53.

While a vaporizing system comprising two columns, 34 and 44, each provided with a partial condenser, and a vaporizer 40, has been disclosed, the present invention is not limited thereto and other arrangements may be employed. Thus, a series of simple flash separators with or without partial condensers may be used. Also, the bottom product from the column 34, containing the oil and solvent, may be fed directly into the column 44, and the bottom product withdrawn from the latter may then be passed into a final vaporizer like the vaporizer 40 to recover the propane-rich solvent as a vapor, for return to the tank 7; or all of the solvent may be initially flashed from the oil and the vapors may then be further fractionated in a series of stages as shown in Figure 2. Further, a series of columns or vaporizers operated at successively higher temperatures, either at substantially the same or at progressively greater or lower pressures may also be used. The only requirement is that the system produce a series of solvent mixtures of progressively different average molecular weights. While it is preferred to produce as many mixed solvents of different average molecular weights as there are separating stages, this is not essential, since a greater or a lesser number of mixed solvents may be produced. When a greater number of mixed solvents is produced, one or more stages receive several mixed solvents; while when a lesser number is produced, two or more stages may be supplied with mixed solvent of the same average molecular weight, or one or more intermediate stages may be supplied with a mixed solvent of intermediate average molecular weight formed by commingling mixed solvents fed to the preceding and succeeding stages. It will be understood that the mixed solvent of highest average molecular weight is fed to the first separating stage and that mixed solvents of progressively lower average molecular weights are fed to the other stages; the reverse may, however, also be practiced.

Moreover, although it is preferred to produce the vapors at pressure sufficiently great to avoid the necessity of pumping the vapors for introduction into the oil at the various stages of the process, it is also possible to generate these vapors at lower pressures, and to provide suitable pumps in the conduits between the tanks 7, 8, and 9 and the heat exchangers 11, 21, and 27, respectively.

Reverting to the precipitating stages, it is understood that the process described constitutes merely one illustrative embodiment, and that the present invention of recovering and returning vapors of progressively different average molecular weights may be applied to other embodiments. Without limiting the scope of the invention thereto, a few of these modified arrangements will be described briefly.

It is not necessary to mix the vapors with the oil in the gaseous state, it being possible to cool and totally condense the vapors prior to commingling them with the oil. If desired, these vapors and/or the oil may be cooled separately to a temperature low enough to permit the heat exchangers to be eliminated and replaced by simple mixing devices.

In the embodiment according to Figure 1 the settling chambers 1 and 2 were operated at about the same pressure of about 40 atmospheres, and chamber 3 at a higher pressure of about 60 atmospheres. It is possible to operate all of the separating stages at the same or substantially the pressure and at the same temperature or at different, preferably decreasing temperatures, thereby obviating the pump 26; or a pump may be provided between each pair of adjacent stages and the successive stages operated at increasing pressures.

Any number of stages may be employed. In the embodiment shown, the precipitated fractions withdrawn at 16, 25, 31, and 42 are progressively lighter and less asphaltic. In a typical case, wherein an asphaltic crude is treated, the fraction withdrawn at 16 may be largely asphaltic; that withdrawn at 25 may contain a large proportion of resins; that taken off at 31 may contain mainly heavy aromatic hydrocarbons, while the dissolved oil or raffinate oil withdrawn at 42 may be highly paraffinic, i. e., contain paraffinic, naphthene ring and alkyl aromatics. These designations are, however, only relative and depend upon the nature of the initial material and of the natures of the fractions desired. If desired, one or more intermediate products may be entirely or partially returned to the process. Thus, the heavy phase withdrawn through the valve 23 may be returned to the feed and flowed through the pump 10. Similarly, all or part of the material flowing through the valve 29 may be returned to stage 1 or 2.

When non-asphaltic oil or other non-hydrocarbon mixtures are treated, the first stage may be eliminated, or the solvent recovery system may be operated so as to produce a solvent in the tank 7 having a higher methane content, or some of the gas from tank 9 may be admitted into the first stage.

The process may also be applied by treating 5 successive heavier phases. Referring to Figure 2, 101, 102, and 103 are settling chambers; 104, 105, and 106 are nozzles; 107, 108, and 109 are surge tanks for solvent mixtures of progressively lower average molecular weights. 110, 111, and 112 are heat exchangers provided with means for bringing oil into intimate contact with gases. 113 and 114 are fractionating columns; and 115 and 116 are partial condensers, all as described in Figure 1. The feed oil, such as a viscous petroleum fraction substantially free from asphalt, is introduced into the heat exchanger 110 by means of liquid pump 117 and commingled with a mixed solvent of relatively low average molecular weight introduced by a valve 118 so as to cause a comparatively large quantity of oil to be precipitated. For example, vapors from the tank 109 containing about 61.5 mole percent methane and 38.5 mole percent propane may be employed. In situations where the average molecular weight of these vapors is so low that an insufficient quantity thereof is soluble in the oil at the prevailing temperature and pressure, a solvent mixture from the tank 107 may also be introduced by a valve 119. The oil and solvent are cooled by the circulation of a cooling medium through suitable coils and the resulting mixture is fed through nozzle 104 into chamber 101 for the separation of the resulting light and heavy liquid phases.

The lighter liquid phase is withdrawn by a valve 120 and fed into a vaporizer 121 heated by a steam coil 122. The dissolved oil is withdrawn by a valve 123 and the solvent mixture is taken off by a conduit 124 and pump 125. The heavier liquid phase containing only minor amounts of solvent is withdrawn by a valve 126, flowed through heat exchanger 111 and commingled with solvent vapors of higher average molecular weight than those employed in heat exchanger 110 by a valve 127 from tank 108. These vapors may, for example, contain 54 mole percent methane and 46 mole percent propane. When the vapors in the tank 108 have too low an average molecular weight, solvent rich in propane from the tank 107 may be admitted via valve 128. The resulting solution is cooled and introduced into chamber 102 via nozzle 105.

The lighter liquid phase from the chamber 102 is withdrawn through valve 129 and the solvent is recovered therefrom in the vaporizer 130, the dissolved oil being withdrawn via valve 131. The heavier liquid phase is withdrawn via valve 132, cooled and commingled with solvent from the tank 107 fed via valve 133 and the resulting solution is introduced into the chamber 103 through the nozzle 106.

The lighter phase is withdrawn through valve 134 and solvent is recovered therefrom in the vaporizer 135, the dissolved oil being withdrawn via valve 136. The heavier phase is similarly withdrawn through the valve 137 and solvent is recovered therefrom in the vaporizer 138, the precipitated heavy oil being withdrawn through valve 139 and the vaporized solvent being introduced into the conduit 124.

The solvent vapors from the various vaporizers are pumped into the fractionating column 113 from which the solvent mixture rich in methane is vaporized, passed through the partial condenser 115 and fed into the tank 109 through the valve 140. The distillation residue is fed through valve 141 to the column 114 from which the solvent mixture of higher average molecular weight than that taken off in the column 113 is withdrawn and fed to the tank 108 via valve 142. The distillation residue, containing a solvent mixture of still higher average molecular weight, such as 90 to 95 per cent propane, is withdrawn through the valve 143 and fed into the tank 107.

In this embodiment, pressures maintained in the tanks 107, 108, and 109 are preferably sufficiently high to avoid the necessity of pumping vapors to the heat exchangers, and the separating stages 101, 102, and 103 may be operated at substantially the same pressures. Any of the modifications described in connection with Figure 1 with regard to temperatures and pressures may be applied also to Figure 2.

In the process illustrated in Figure 2 the oil withdrawn at 123 is the most paraffinic and the products withdrawn at 131, 136, and 139 are progressively less paraffinic and progressively heavier.

The process may be operated with any of the low molecular weight solvents known in the art. In the usual case, from 1 to 12 volumes of the solvent for one volume of the initial high molecular mixture being fractionated are employed, a ratio of 1 to between 3 and 6 being preferred. In general, it is preferable to employ solvent mixtures containing at least one constituent having a critical temperature below 130° C., although solvent mixtures the lightest constituent of which has a critical temperature as high as 350° C., like pentane, hexane, have been found to be operative. When employing solvent mixtures containing only constituents having critical temperatures above 130° C., i. e., requiring operations above about 90° C., it is usually desirable to introduce water or a similar substance into the system to improve the separation, it having been found that water, while substantially immiscible with oil, is slightly miscible with these solvents under paracritical conditions for the solvent. By this method temperatures as high as 400° C. and above may be employed. Examples of substances which are suitable for use in the solvent mixtures are: Methane, ethane, ethylene, propane, propylene, acetylene, butanes, hydrogen, carbon monoxide, carbon dioxide, water gas, natural gas, ammonia, dichlordifluor methane, methylene fluoride, ethyl chloride, and dimethyl ether.

The mixed solvent may consist of several substances of the type enumerated above, some or all of which are in the paracritical state, or of one or more such substances together with a constituent of somewhat higher molecular weight, which may be liquid and below its paracritical temperature range under the conditions of the process. Low boiling aliphatic hydrocarbons or liquefied aliphatic hydrocarbons of the type known as deasphalting agents, such as propane, propylene, butanes, pentanes, amylenes, hexanes, hexenes, their mixtures, as well as light, straight run naphthas and other light, preferably aromatic free fractions of mineral oil, boiling preferably below about 270° C. are particularly suitable for use as the heavier constituent.

The process may also be carried out with a mixed solvent containing non-hydrocarbon solvents such as acetone, pyridine, liquid sulfur dioxide, cresylic acid, and other solvents of the type of preferential solvents for non-paraffinic hydrocarbons.

We claim as our invention:

1. A continuous process for separating a high molecular weight oleaginous mixture into fractions having different properties, comprising the steps of subjecting said mixture to the precipitating action of a low molecular weight mixed solvent containing a light constituent in a paracritical state and a heavier constituent, each constituent having a molecular weight lower than the average molecular weight of said mixture in a plurality of at least three successive separating stages by increasing the concentration of the said light constituent in successive stages, thereby causing the formation of a light liquid phase and a heavier phase containing different portions of the mixture in each separating stage, separating the phases in each stage and transferring the light liquid phase from each stage to the next stage, separating the mixed solvent withdrawn from the last separating stage into a plurality of at least three mixed solvents of different average molecular weights containing said light and heavier constituents, and returning the resulting separated mixed solvents to different separating stages of the process.

2. The process according to claim 1 in which the mixed solvent withdrawn from the last separating stage is separated into at least as many mixed solvents as there are stages, the mixed solvent of highest average molecular weight is returned to the first separating stage, and successive mixed solvents of progressively lower average molecular weights are returned to successive treating stages.

3. A process for separating a high molecular weight oleaginous mixture into fractions having different properties, comprising the steps of subjecting the mixture in a series of at least three separating stages successively to the precipitating actions of at least three mixed solvents of progressively different average molecular weights, all mixed solvents containing a common light constituent in a paracritical state and a common heavier constituent having a molecular weight lower than the average molecular weight of said mixture to produce non-gaseous phases of different densities containing different portions of said mixture in each of said stages, by separating the phases in each of said stages and transferring one of the phases formed in a first stage to an intermediate stage and one of the phases formed in an intermediate stage to the final stage, separating from at least one phase a plurality of mixed solvents containing said light and heavier constituents and having different average molecular weights, and returning one separated mixed solvent to the first stage, another separated mixed solvent of different average molecular weight to the final stage, and still another separated mixed solvent of intermediate average molecular weight to the intermediate stage.

4. A process for separating a high molecular weight oleaginous mixture into fractions having different properties, comprising the steps of subjecting the mixture in a series of at least three separating stages successively to the precipitating actions of at least three mixed solvents of progressively lower average molecular weights, all mixed solvents containing a common light constituent in a paracritical state and a common heavier constituent having molecular weight lower than the average molecular weight of said mixture to produce non-gaseous phases of different densities containing different portions of said mixture in each of said stages by separating the phases in each of said stages, and subjecting the portion of the mixture in the lighter phase formed in the first stage to said precipitating treatment in an intermediae stage, and subjecting the portion of the mixture in the lighter phase formed in an intermediate stage to said precipitating treatment in the final stage, separating from at least one phase a plurality of mixed solvents containing said light and heavier constituents and having different average molecular weights, and returning one separated mixed solvent of relatively high average molecular weight to the first stage, another separated mixed solvent of relatively low average molecular weight to the final stage, and still another separated mixed solvent of intermediate average molecular weight to the intermediate stage.

5. A process for separating a high molecular weight oleaginous mixture into fractions having different properties, comprising the steps of subjecting the mixture in a series of at least three separating stages successively to the precipitating actions of at least three mixed solvents of progressively higher average molecular weights, all mixed solvents containing a common light constituent in a paracritical state and a common heavier constituent having a molecular weight lower than the average molecular weight of said mixture to produce non-gaseous phases of different densities containing different portions of said mixture in each of said stages by separating the phases in each of said stages and subjecting the portion of the mixture in the heavier phase formed in the first stage to said precipitating treatment in an intermediate stage, and subjecting the portion of the mixture in the heavier phase formed in an intermediate stage to said precipitating treatment in the final stage, separating from at least one phase a plurality of mixed solvents containing said light and heavier constituents and having different average molecular weights, and returning one separated mixed solvent of relatively low average molecular weight to the first stage, another separated mixed solvent of relatively high average molecular weight to the final stage, and still another separated mixed solvent of intermediate average molecular weight to the intermediate stage.

6. A process for separating a hydrocarbon oil containing components of lubricating viscosity range into fractions, comprising the steps of subjecting said oil in a first separating stage to the precipitating action of a first mixed solvent comprising a diluent of the type of deasphalting solvents and a lighter constituent in the paracritical state to cause the formation of two first liquid phases containing different portions of the oil, separating said liquid phases, adding an intermediate mixed solvent comprising said diluent and containing said lighter constituent in a higher concentration than said first mixed solvent to the separated first lighter liquid phase in an intermediate separating stage to cause the formation of intermediate liquid phases of different densities containing different portions of the oil, separating the intermediate liquid phases, adding a final mixed solvent comprising said diluent and containing said lighter constituent in a higher concentration than said intermediate mixed solvent to the separated intermediate lighter liquid phase in a final separating stage to cause the formation of final liquid phases of different densities containing different portions of the oil, separating the final liquid phases, passing the separated final lighter liquid phases through a series of vaporizing stages to separate therefrom a plurality of mixed solvents containing said diluent and said lighter constituent in different proportions, and returning a separated mixed solvent having a relatively high concentration of the diluent to said first stage, a separated mixed solvent having a relatively lower concentration of the diluent and a relatively higher concentration of the lighter constituent to said final stage, and a separated mixed solvent having intermediate concentrations of the diluent and of the lighter constituent to said intermediate stage for the treatment of a subsequent quantity of oil.

ERIC STANLEY HILLMAN.
WELLS ALAN WEBB.